(12) United States Patent
Hoyt

(10) Patent No.: X4174
(45) Date of Patent: Sep. 9, 1825

(54) THRASHING MACHINE

(76) Inventor: William Hoyt

The Schedule referred to in these Letters Patent, and making part of the same, containing a description in the words of the said William Hoyt him:self of his improvement in the machine for thrashing grain.

First. Two fluted cylinders or rollers six inches diameter and three feet long, are to be placed in a permanent and convenient frame ho:rizontally: one of which is to be placed so as to move round on central gudgeons, carrying a spur wheel on one end, two feet ... diameter.

The second roller is to assume a parallel position; but to be raised about one half of its diameter higher than the other; but at such angle and distance as to receive motion from it. When said rollers are in motion; they draw the straw through between them, loosen the grains, and hold the straw whilst the beaters finish the work.

The second roller is to be capable of withdrawing from its first station and returning; and to that effect each gudgeon must be seated in an oblong head block, or box; and each box placed in an oblong mortice or [illegible], running in a direct line or angle from the centre of the rollers in a range, and to extend a sufficient space beyond each box for the reception of a suitable spring by means of which said roller is permitted to leave its station, and return in proportion to the quantity of grain that is between them. These two beaters are to be constructed as follows, viz: Two shafts of the same length as the above rollers, are to be made of timber or iron: four arms are to pass through near each end of each roller or shaft at right angles from the centre: and at equal distances from each other all round the shaft. The length of each arm from its end to the centre of the shaft must be one foot, at the ends; and across each two of these arms, parallel to the shaft must be fastened a suitable piece of timber or iron, which forms the beater: The [illegible] of each beater is to be [illegible] to its respective wheel or pinion, so that when the whole is in operation, the beaters themselves attached to each different shaft will uniformly follow each other in succession; yet each revolving towards the other. An increased number of beaters may be added if necessary, a suitable platform or trough is to be placed in the common form for feeding with grain, or semicircle made of thin boards of a suitable length and diameter, must be made fast to the hinder part of the frame, inclosing that part of the beaters: at the lower part of said semicircle a floor must be made descending towards the front to convey the grain to the fan; and for that purpose the lower side or part of said floor must extend over the centre of said shaft of the starting wheel; which is to be turned smooth, and is to supply the place of a drum for a band: a small roller is to be placed parallel to said shaft in the front part of the same, and in the same angular line with the shaft and floor: said shaft and roller are encircled by a band made of netting, on the principle of the fish net, or sein; or it may be wire or leather with holes &c. When the machinery is in operation this band not only admits the grain to descend (through its apertures) on the angular floor which delivers it to the fan, but carries the straw clear of all the machinery: its shaft carries a pinion or wallower, six inches diameter and takes motion from the starting or driving wheel. The above machinery may be put in motion by manual, by horse, or by any other sufficient power.

The above I consider as improvements on what is called the scotch thrashing machine, and for which improvements I claim a patent.

William Weyl.

Witnesses
Wm. P. Elliot; }
J. A. Elliot. }

Exd. [illegible]

(4.84 words)

Draftsman's Division.

*All communications should be addressed to "The Commissioner of Patents, Washington, D. C."*

2—328 a.

*Department of the Interior,*

United States Patent Office,

*Washington, D. C., ______________, 189__*

*Sir:*

*The printed* copies *of Patent No.* W Hoyt are *exhausted.* Sep 9 1825

*As soon as printed a copy will be mailed you to complete your order.*

*By direction of the Commissioner:*

*Very respectfully,*

*Chief Clerk.*

8143b6-97-5m